Figure 1:
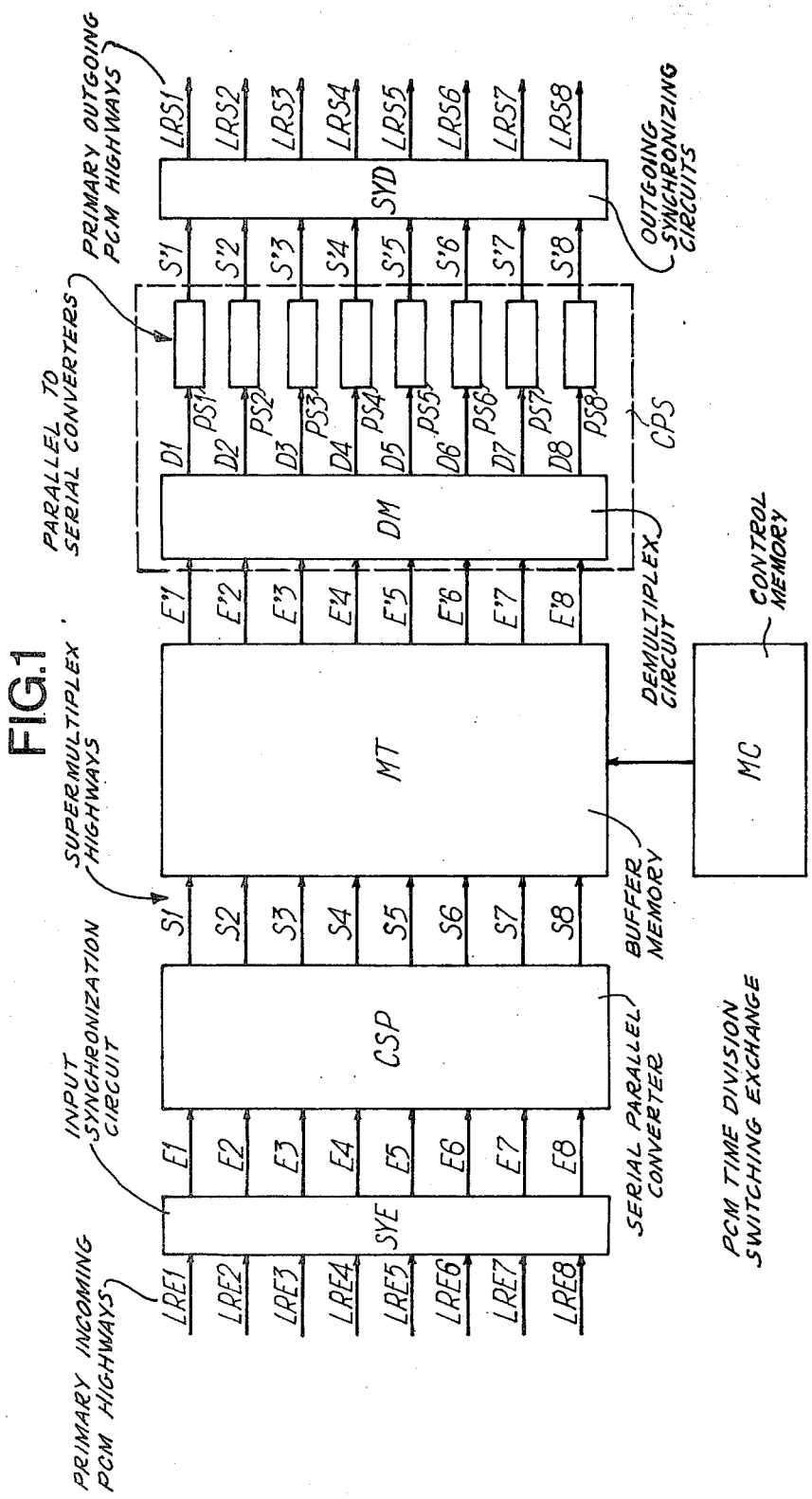

United States Patent [19]

Roche

[11] 4,157,458
[45] Jun. 5, 1979

[54] CIRCUIT FOR USE EITHER AS A SERIAL-PARALLEL CONVERTER AND MULTIPLEXER OR A PARALLEL-SERIAL CONVERTER AND DEMULTIPLEXER IN DIGITAL TRANSMISSION SYSTEMS

[76] Inventor: Alain Y. D. Roche, 37, Avenue de Lorraine, Ker Heul - Lannion, France, 22300

[21] Appl. No.: 860,484

[22] Filed: Dec. 14, 1977

[30] Foreign Application Priority Data

Dec. 30, 1976 [FR] France .................................. 7639833

[51] Int. Cl.² ............................................... H04J 3/04
[52] U.S. Cl. ................................................. 179/15 A
[58] Field of Search ...................................... 179/15 A

[56] References Cited

U.S. PATENT DOCUMENTS 3,821,480  6/1974  Dundon et al. .................... 179/15 A

FOREIGN PATENT DOCUMENTS 2225898  11/1974  France .................................. 179/15 A Primary Examiner—Thomas W. Brown
Attorney, Agent, or Firm—Charles A. Laff; J. Warren Whitesel; Howard B. Rockman

[57] ABSTRACT

A serial-parallel converter converts serial mode 8-bit words, delivered from a plurality of primary digital multiplx highways into parallel mode 8-bit words and multiplexes the 8-bit words to form a signal for a supermultiplex highway. The converter comprises eight parallel-write, serial-read input shift registers and seven serial-write, serial-read output shift registers. The write inputs of the output shift registers are respectively connected to the serial output of the input shift registers having the same rank. The serial read outputs of the output shift registers deliver a serial output of the eighth input shift register to the supermultiplex highway. All of the input shift registers comprise eight stages. The output shift registers have decreasing numbers of stages from 7 down to 1. The writing operation, into input shift registers, and shifting operation through all registers are controlled by a single 8-stage shift register. That single shift register circuit may also be used for demultiplexing the signals on a supermultiplex highway and converting the resulting parallel-mode 8-bit words into serial-mode 8-bit words to be delivered to outgoing primary digital multiplex highways. That single shift register circuit is particularly well-suited for time division switching systems.

5 Claims, 8 Drawing Figures

DEMULTIPLEXER PARALLEL-SERIAL CONVERTER CIRCUIT

CIRCUIT FOR USE EITHER AS A SERIAL-PARALLEL CONVERTER AND MULTIPLEXER OR A PARALLEL-SERIAL CONVERTER AND DEMULTIPLEXER IN DIGITAL TRANSMISSION SYSTEMS

The present invention relates to a circuit for use either as a serial-parallel converter and multiplexer or as a parallel-serial converter and demultiplexer, in a digital transmission system.

Operations are required for serial-parallel conversion of digital multiplexed channel data and the multiplexing thereof. These operations provide signals for a supermultiplex highway in digital data time division switching networks. Indeed, in digital data time division switching networks, data which is re-transmitted from a time division exchange to another such exchange via primary digital multiplex highways wherein data belonging to a channel currently form an octet or 8-bit word. At each time division switching exchange input, there are serial-parallel converter circuits for converting serial 8-bit words into parallel 8-bit words. Each serial-parallel converter circuit is assigned to a digital multiplex highway. Then multiplexer circuits operate a multiplexing of parallel 8-bit words received in the same time slot from a plurality of primary digital multiplex highways, in order to form a parallel 8-bit word for supermultiplex highway transmitting the parallel 8-bit words to a buffer memory. A control memory determines the order according to which the parallel 8-bit words stored in the buffer memory are read out therefrom. Such an order embodies the connections to be set up from the ingoing primary multiplex highway channels to the outgoing primary multiplex highway channels. The parallel 8-bit words read out together from the buffer memory form a parallel 8-bit word signal for a supermultiplex highway that is demultiplexed in demultiplexer circuits. Then they are converted into serial 8-bit words in parallel-serial converter circuits for delivering serial 8-bit words to respective outgoing primary multiplex highways. The above described time division switching exchange structure corresponds to a one-stage structure; however the various mentioned circuits also exist in multistage time-division switching exchanges.

In particular serial-parallel converter circuits combined with multiplexer circuits are already known for instance from the specifications of the following published French Patents Nos. 2,170,405; 2,225,898 and 2,265,240.

A purpose of the present invention is to provide a circuit that is designed, on the one hand, for converting serial mode channel data, from a plurality of primary digital multiplex highways, into parallel mode channel data and, on the other hand, for multiplexing the parallel mode channel data to form a supermultiplexing highway signal. In each time slot in the supermultiplex, there is as many parallel mode channel data as there are primary digital multiplex highways, that is improved with respect to the circuits that are already known and particularly those circuits that are described in the hereabove mentioned Patents.

Another purpose of this invention is to provide such a circuit designed for processing channel data arranged in 8-bit words. The 8-bit words are received from eight primary digital multiplex highways having their respective frames synchronized.

According to a feature of this invention, there is provided a converter circuit designed, on the one hand, for converting serial mode channel data from a plurality of primary digital multiplex highways into parallel mode channel data. On the other hand, the converter multiplexes parallel mode channel data to form supermultiplex highway signals comprising in a channel time slot, as many parallel mode channel data as there are primary digital multiplex highways connected to said converter circuit. Channel data is arranged in 8-bit words and is received from eight primary digital multiplex highways, whose frames have been synchronized before being applied to said converter circuit. The converter comprises seven serial-write serial-read output shift register. A first output shift register is composed of seven stages. A second output shift register is composed of six stages and so on up to the seventh output shift register which is composed of one stage. The converter circuit also comprises eight inputs respectively connected to eight ingoing primary digital multiplex highways. Further, the converter circuit comprises eight parallel-write serial-read input shift registers each composed of eight stages. The eighth converter circuit inputs are multipled to write stage inputs of the input shift registers respectively. The first input shift register read output is connected to the first output shift register write input. The second input shift register read output is connected to the second output shift register write input, and so on up to the seventh input shift register read output, which is connected to the seventh output shift register write input. Eight converter circuit outputs are respectively connected from the output shift register read outputs and eighth input shift register read output, and a loop-connected parallel-read eight-stage control shift register. Every shift in an input-, output- or control shift register is performed at the primary digital multiplex highway bit rate. Each write control input of either input- or control shift register causes, when turned on by a write control signal, the corresponding shift register to perform a write operation instead of a shift operation. Write control inputs of input shift registers are respectively connected to read outputs of a control shift register in accordance with the rank of said input shift registers. The write control input of the control shift register is rendered operative by an initializing signal.

According to another feature of this invention, there is provided a converter circuit designed for converting serial mode channel data arranged in sets of $\underline{n}$ bits in each channel of a primary digital multiplex highway. The converter circuit is connected from $\underline{n}$ primary digital multiplex highways and comprising $\underline{n}$ inputs, instead of 8, and $\underline{n}$ input shift registers, instead of 8, n-1 output shift registers, instead of 7, and $\underline{n}$ outputs, instead of 8, and a n-stage control shift register, instead of an 8-stage control shift register.

According to another feature of this invention, there is provided a converter circuit, as hereabove described, which may be used for converting parallel mode channel data from a supermultiplex highway into serial mode channel data, and for demultiplexing the parallel mode channel data for delivering signals over an outgoing primary digital multiplex highway. Converter circuit inputs are connected from transmission wires of the supermultiplex highway and the converter circuit outputs are connected to lines transmitting the outgoing primary digital multiplex highway.

Figure 2:
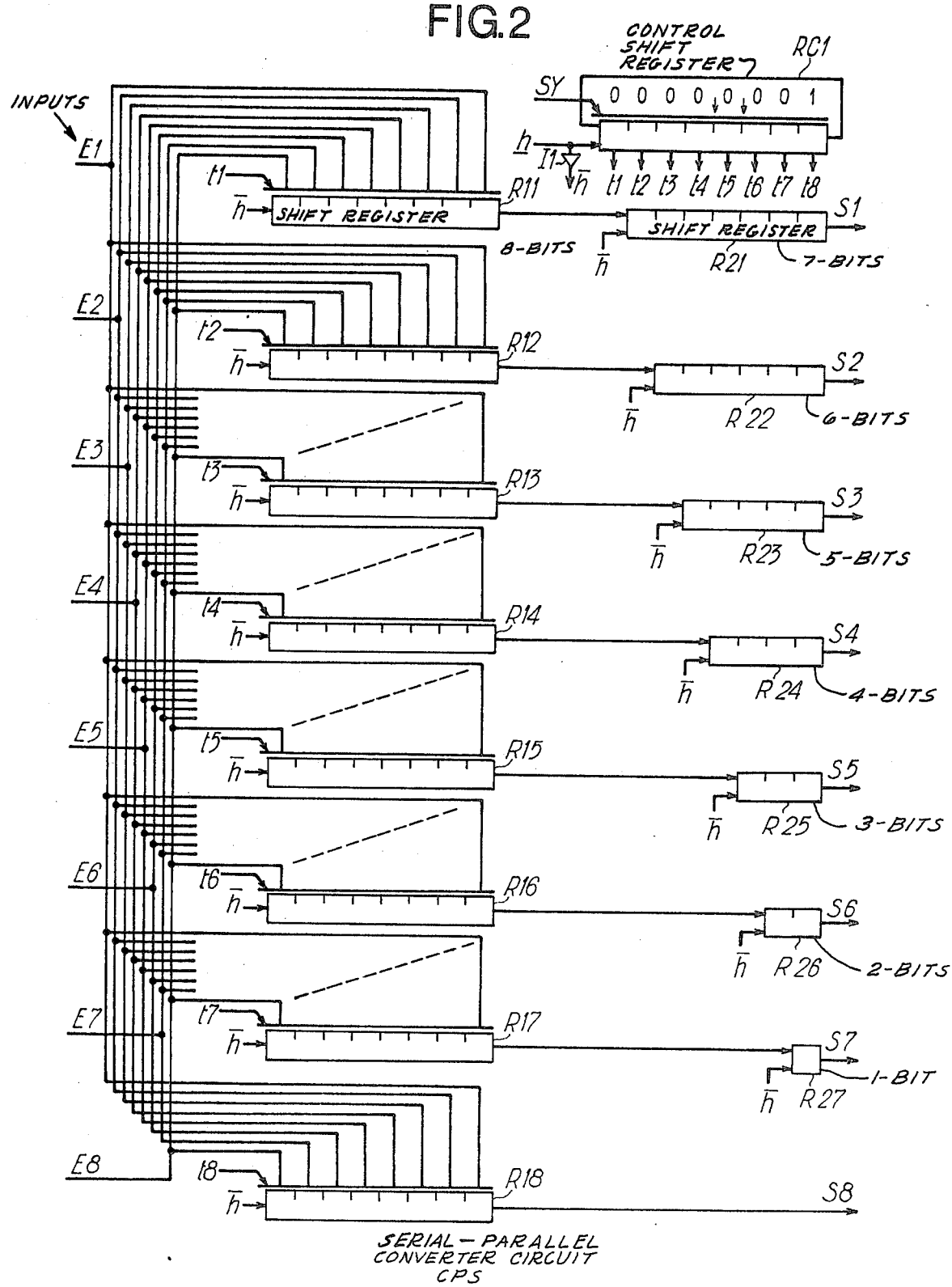
Figure 3:
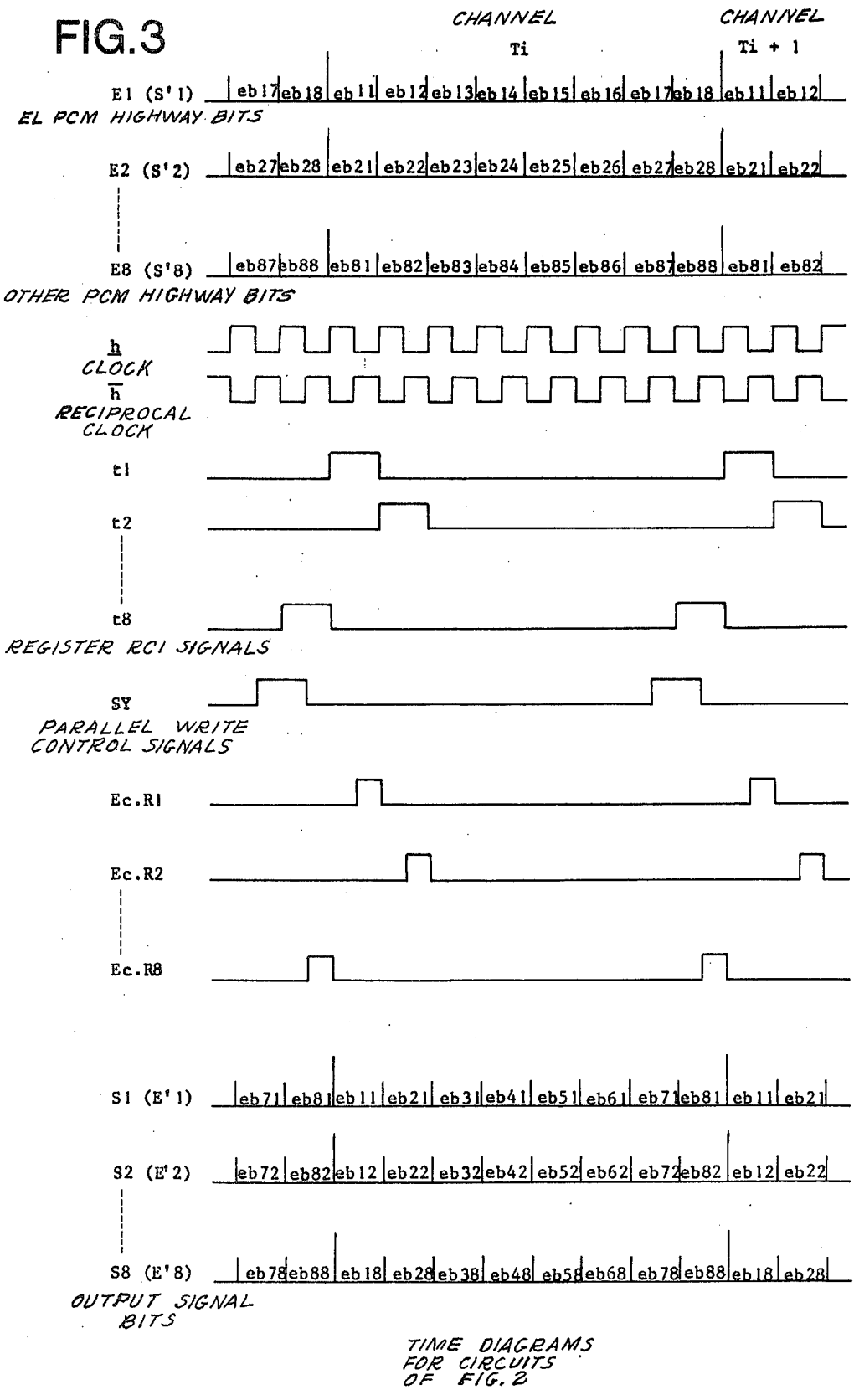
Figure 4:
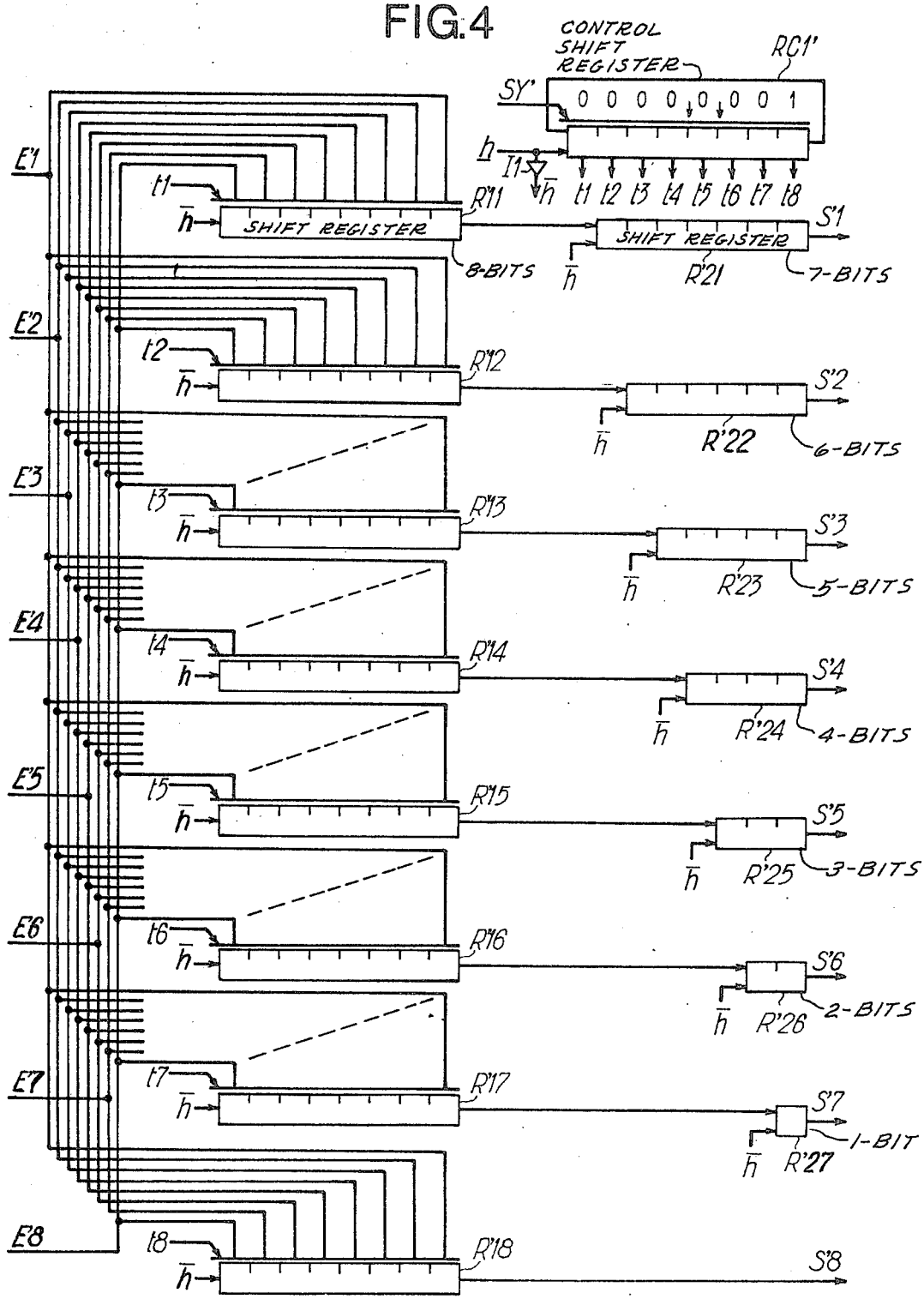

The above mentioned purposes and features of the present invention, as well as other purposes and features, will appear more clearly from the following description of embodiments, the description being made in conjunction with the accompanying drawings, wherein:

FIG. 1 is a block-diagram of a time division switching exchange including a serial-parallel converter multiplexer circuit according to this invention, FIG. 2 is the diagram of the circuit according to this invention, FIG. 3 is a time diagram illustrating waveforms of signals utilized in the circuit shown in FIG. 2, FIG. 4 is the diagram of a demultiplexer parallel-serial-converter circuit having the same structure as the circuit shown in FIG. 2, and FIGS. 5-8 are block-diagrams of switching assemblies wherein circuits shown in FIG. 2 and FIG. 4 are employed.

In the following description reference is made to a digital data time division switching network wherein ingoing and outgoing primary digital multiplex highways are arranged in accordance with specifications of the first order PCM multiplex system, issued by the "Conférence Européenne des Postes et Telecommunications" (European Post and Télécommunication Conference) or CEPT. It is recalled that according to CEPT specifications, in each primary multiplex highway transmission rate is 2,048 kbit/s, each frame of 125 µs is shared in 32 time slots, each time slot having a duration of 3.9 µs ordered from IT0 to IT31. Each time slot ITi corresponds to the transmission of an 8-bit word includes eight bit times t1-t8, each bit time having a duration of 490 ns. However it must be clearly understood that the circuit according to this invention may also be applied to other digital multiplex systems, such as for instance the 24-channel PCM multiplex system operating at 1,544 kbit/s and standardized by the CCITT.

In FIG. 1, the illustrated time division switching exchange is connected from eight CEPT primary multiplex highways LRE1-LRE8. Highways LRE1-LRE8 are connected to an input synchronization circuit CYE that synchronizes frames of highways LRE1-LRE8 so that time slots IT0-IT31 thereof are synchronized as well as bit times t1-t8 in each time slot. Such an input synchronization circuit is well known in the art and is not within the scope of this invention. Synchronization circuit SYE delivers to inputs E1-E8 of a serial-parallel-converter and multiplexer circuit CSP synchronized 8-bit words of same rank from highways LRE1-LRE8, respectively. Circuit CSP delivers from its outputs S1-S8 a supermultiplex highway transmitted on eight wires to a buffer memory MT whose read operation is controlled from a control memory MC. Under control of control memory MC, buffer memory MT delivers a supermultiplex highway on eight wires connected to inputs E'1-E'8 of a demultiplexer circuit DM whose outputs D1-D8 each having eight wires are respectively connected to inputs of eight parallel-serial converter circuits PS1-PS8, whose outputs are connected to corresponding inputs of an output synchronization circuit SYD delivering from outputs eight outgoing primary digital multiplex highways LRS1-LRS8. Circuits MT, MC, DM, PS1-PS8 and SYD may be conventional and there is no reason to further describe them in detail.

The diagram of circuit CSP is shown in FIG. 2. It comprises eight shift registers R11-R18, each comprising eight stages, seven shift registers R21-R27, R21 comprising seven stages, R22 comprising six stages, R23 comprising five stages, ..., and R27 comprising one stage, and a control shift register RC1 comprising eight stages.

Each shift register R11-R18 operates in a parallel write mode and a serial read mode. Write inputs of stages 1-8, in shift registers R11-R18, are respectively parallel connected from inputs E1-E8. Shift registers R21-R27 operate in serial write mode and serial read mode. Read output of register R11 is connected to write input of register R21 whose read output is connected to output S1; read output of register R12 is connected to write input of register R22 whose read output is connected to output S2; ...; read output of register R17 is connected to write input of register R27 whose output is connected to output S7; and read output of register R18 is directly connected to output S8.

Control shift register RC1 operates in a parallel write mode, but has its serial read output connected back to its serial input to form a loop circuit. Each stage of control shift register RC1 has also a parallel read output for delivering successive time signals t1-t8. Shift control input of register RC1 receives clock pulses $\underline{h}$ at 2 MHz. Write control input of RC1 receives a synchronization signal SY, the purpose of which will be later described. Shift control input of RC1 is, in addition, connected to an input of a logic inverter I1 that delivers signal $\overline{h}$.

Write control inputs of registers R11-R18 respectively receive signals t1-t8. Their shift control inputs, as well as shift control inputs of registers R21-R27 receive signal $\overline{h}$. Signal $\overline{h}$ controls the write-in of stages or flip-flops of those registers, when it turns from condition 0 to condition 1. When signal SY or signals t1-t8 are in condition 1, the change of signal $\overline{h}$ causes the corresponding registers to store or write in a parallel mode, the eight bits being applied at that time to their write inputs. When signal SY or signals t1-t8 are in condition 0, change of signal $\overline{h}$ causes a serial shift in each corresponding register.

FIG. 3 shows time diagrams and signal waveforms which are useful for describing the operation of the circuit CSP shown in FIG. 2. The line E1 represents the sequences on the bits of channels Ti−1, Ti and Ti−1 of primary multiplex highway LRE1. Each bit is indicated by two figures, the first one indicating that the bit belongs to the first primary multiplex highway and the second one indicating the rank of the bit in the considered time slot Ti. Also shown are the bits delivered from inputs E2-E8. It is to be noted that time slots of the eight primary multiplex highways are synchronous.

In the line h is represented is the 2 MHz clock signal that is synchronous with bit times of ingoing primary multiplex highways. In $\overline{h}$ represented is the reciprocal signal of signal $\underline{h}$. In t1-t8, represented are corresponding signals delivered from register RC1.

Line SY represents the waveform of the parallel write control signal applied to register RC1. It appears that signal SY has, as signals t1-t8, a duration of 490 ns, but these signals are ahead or lead by 245 ns with respect to signal t8. As register RC1 has its serial output connected to its serial input, bit 1 of SY, once applied, is shifted stage by stage for generating signals t1-t7, then again t8, and so on. Signal SY, as with clock signal h, is delivered from input synchronization circuit SYE.

At time t1, bits eb11, eb21, eb31, eb41, eb51, eb61, eb71 and eb81 are being applied to parallel write inputs of register R11. At time t2, bits eb12, eb22, ..., eb82 are being applied to parallel write inputs of register R12, and so on, up to time t8 wherein bits eb18, eb28, . . . , eb88 are being applied to parallel write inputs of register R18. Furthermore, as a result of the seven shifts applied to bit eb11 in register r21, at time t8 the bit eb 11 has reached the last stage of register R21. Similarly, between times t2 and t8, bit eb12 has been shifted six times in register R22 and thus is standing at time t8, in the last stage of register R22, and so on. Thus, at the next time t1, register R21 delivers the bit eb11 that was written at the beginning of the preceding time slot T1 into register R11. Register R22 delivers the associated bit eb12. Register R23 delivers the associated bit eb13, . . . , and register R18 delivers the associated bit eb18.

Those signals are delivered from outputs S1–S8 at time t1 as indicated by time diagrams S1–S8, FIG. 3. Thus, it appears that the hereabove mentioned serial-parallel conversion is completed for the bits of a channel time slot belonging to a primary digital multiplex highway. Furthermore, obviously bits eb12–eb82 of highway LRE2, through E2, are converted in a same manner, but are delivered from outputs S1–S8 only at the bit time following t1 because they are respectively written into shift registers R11–R18 in stages located on the left side of stages which stored bits eb11–eb81. Therefore they are delivered from S1–S8 at time t2, and so on for the bits of highways LRE3–LRE8. Thus it appears that, at the same time that circuit CSP operates a serial-parallel conversion, it operates a supermultiplexing of ingoing highways.

The circuit shown in FIG. 4 is substantially identical to that shown in FIG. 2, with the exceptions that alphanumeric references indicating inputs, outputs and shift registers are quoted. Next to be described is how the circuit shown in FIG. 4 can be substituted for circuits DM and PS1–PS8, FIG. 1, which are shown included in a dashed line box CPS. Circuit CPS, FIG. 4, simultaneously performs demultiplexing of supermultiplex highway signals delivered from buffer memory MT to inputs E'1–E'8 and parallel-serial conversion, so as to deliver, from outputs S'1–S'8, the channel bits to outgoing primary digital multiplex highways LRS1–LRS8. These delivered bits are correctly synchronized through circuit SYD. Reference is still made to time diagrams and waveforms shown in FIG. 3. First to be considered are bits applied to inputs E'1–E'8, as indicated at the bottom of FIG. 3, then reference is upwards for finding bits delivered from outputs S'1–S'8.

At time t1, bits eb11–eb18 are being applied to parallel write inputs of shift register R'11. At time t2, bits eb21–28 are being applied to parallel write inputs of shift register R'12, and so on up to time t8 wherein bits eb81–88 are being applied to parallel write inputs of shift register R'18. Furthermore as a result of the seven shifts applied to bit eb11 through shift register R'21, the bit eb11 is in the last stage of shift register R'21 at time t8. In a similar manner, from time t2 to time t8, bit eb21 has been shifted six times through shift register R'22 and at that time t8 is also in the last stage of shift register R'22, and so on. Thus, at the next time t1, shift register R'21 delivers the previously written bit eb11. Shift register R'22 delivers an abreast bit eb21 of the adjacent outgoing highway. Shift register R'23 delivers an abreast bit eb31, . . . , and shift register R'18 delivers an abreast bit eb81. Those bits constitute the signals delivered from outputs S'1–S'8 at time t1. Thus it appears that the above mentioned demultiplexing of the supermultiplex highway as well as a parallel-serial conversion have been achieved.

As already hereabove mentioned, those circuits which are shown in FIGS. 2 and 4 can also process primary PCM multiplex systems having 24 channels and operating at 1,544 kbit/s. It is known that, in such systems, a frame comprises 193 bits, the first 192 bits corresponding to 24 digital channels at 64 kbit/s while the last bit carries alignment signals and/or signalling. In such a case, clock signal h indicated in FIGS. 2 and 4 has a frequency of 1.544 MHz, with a pulse periodically missing.

Figure 5:
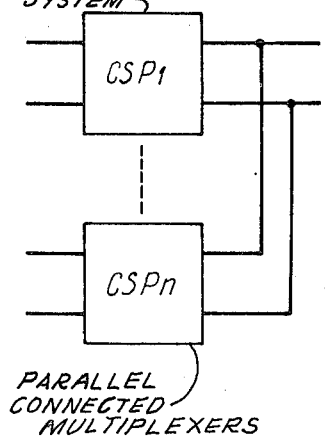
Figure 6:
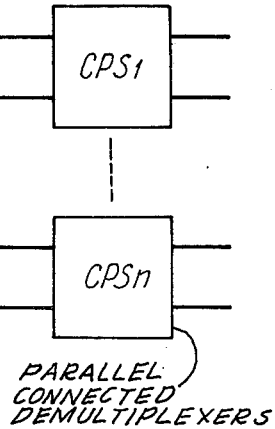

When buffer memory MY is designed so as to operate at a rate higher than 2 Mbit/s, several circuits CSP1–CSPn may be parallel connected as shown in FIG. 5. Thus a 256-channel supermultiplex highway may be obtained. FIG. 6 shows how such a supermultiplex highway of signals may be demultiplexed by use of n circuits CPS1–CPSn, with n=8.

Figure 7:
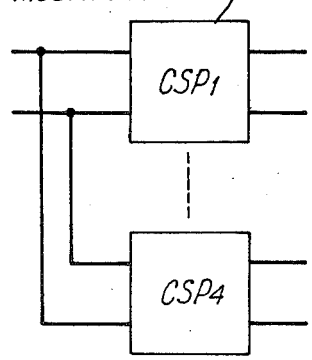
Figure 8:
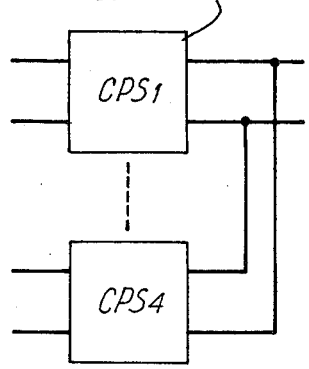

When ingoing digital multiplex highways are second-order synchronous multiplex highways, the circuit shown in FIG. 7 may be used. For instance, in a second-order multiplex system operating at 8.224 Mbit/s, it is known that it comprises 132 channels amongst which a maximum of 128 channels are allotted to telephone or data transmission circuits, and bits in 4 successive 8-words are interlaced. Parallel connected circuits CSP1–CSP4 are used for demultiplexing the second order multiplex highway. Then, the resulting digital data is serial-parallel converted so as to deliver supermultiplex highway signals operating at 2.048 Mbit/s. The circuit shown in FIG. 8, including circuits CPS1–CPS4, makes it possible to perform the reciprocal operations. When the supermuliplex highway must operate at 8.224 Mbit/s, multiplexing operations are provided as shown in FIGS. 5 and 6.

In particular, it will be noted that the hereabove described converter circuits would require less gates than needed in known circuits and are feasible as integrated circuits that substantially reduce costs.

When, instead of using bits arranged in 8-bit words, data bits are arranged in n-bit words, the hereabove described circuits would comprise n inputs and n outputs, n n-stage input shift registers and n-1 output shift registers, with a n-stage control shift register.

While the principle of the present invention have hereabove been described in relation with specific embodiments, it must be understood that the description was made by way of example and not as a limit to the scope of this invention.

What is claimed is:

1. A converter circuit for a PCM switching system, means for connecting up to a predetermined number of primary digital multiplex highways with synchronized time frames and bit rates to said converter circuit, said converter comprising means for converting primary multiplex highway channel data from a serial mode into a parallel mode, means for multiplexing said parallel mode channel data to form a supermultiplex highway of signals, means for providing a plurality of cyclically recurring time slots with as many parallel mode channels as there are primary digital multiplex highway connections on said converter circuit, said channel data being arranged in n-bit words, m-1 serial-write, serial-read output shift register means in said converter circuit, each of said m-1 shift register means having one stage less than the number of stages in the preceding shift register means, m parallel-write serial-read input shift register means for receiving signals from individually associated ones of said primary highways, each of said input shift register means having n-stages, means for connecting each input shift register read output terminal to a corresponding output shift register write input terminal, m converter circuit output means respectively connected to the corresponding output terminals of said output shift register means, a loop-connected parallel-read n-stage control shift register means, means for synchronously performing every shift in every shift register at the same primary digital highway bit rate, write control input means on each of said input and control shift register means for causing that shift register to write instead of to shift, means for connecting the write control inputs of said input shift register means to read outputs of said control shift register means in accordance with the rank of said input shift register means, and means for applying an initial signal to the write control input of said control shift register means for initiating an operation said control shift register.

2. The converter circuit of claim 1 wherein n=8 so that there are 8 bits in every channel of a primary multiplex highway and wherein m=8 so that there are 8 inputs and 8 input shift register means, 7 output register means, and an 8-stage control shift register means.

3. A converter circuit, according to claim 1, for converting parallel mode channel data from supermultiplex highway signals into serial mode channel data, and means for demultiplexing said parallel mode channel data for delivering outgoing primary digital multiplex highway signals, said converter circuit inputs being connected from transmission wires of said supermultiplex highway, and the output of said converter circuit being connected to lines for transmitting said outgoing primary digital multiplex highway.

4. Converter circuits according to claim 1, there being a plurality of said converter circuits arranged in a set having multiplexed outputs, the output supermultiplex bit rate being a multiple of a converter circuit output multiplex rate.

5. Converter circuits according to claim 1, there being a plurality of said converter circuits arranged in a converter circuit set having its inputs connected from said primary digital multiplex highways responsive to demultiplexing multiplex highway signals having a bit rate that is a multiple of the bit rate of a primary digital multiplex highway.

* * * * *